April 29, 1930.  N. A. BUSHONG  1,756,482
DEVICE FOR ENCOURAGING DENTAL CORRECTION
Filed July 13, 1929  3 Sheets-Sheet 1
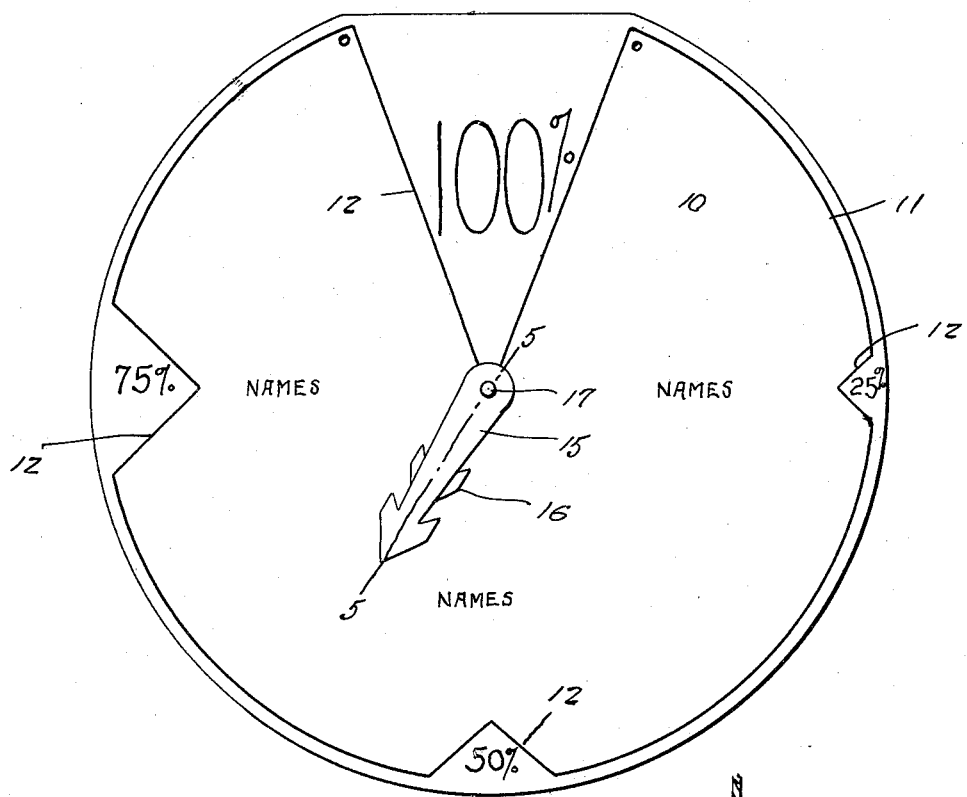
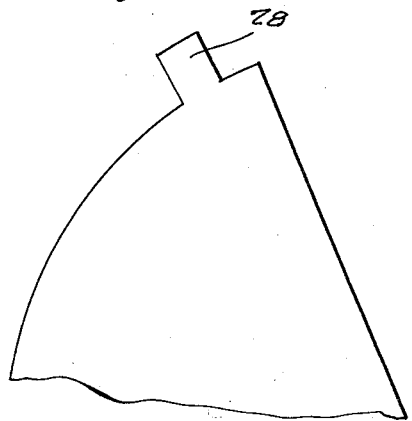
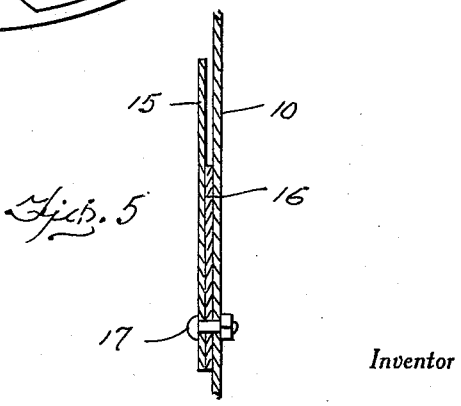
Inventor
Neva A. Bushong
By Clarence A. O'Brien
Attorney April 29, 1930. N. A. BUSHONG 1,756,482
DEVICE FOR ENCOURAGING DENTAL CORRECTION
Filed July 13, 1929 3 Sheets-Sheet 2
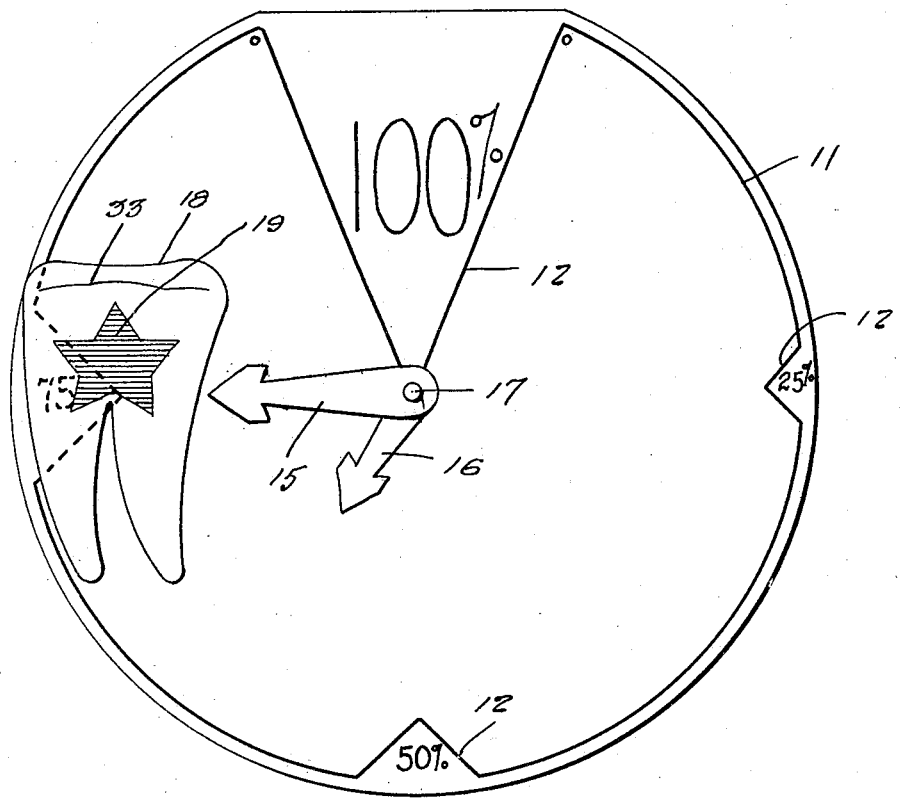
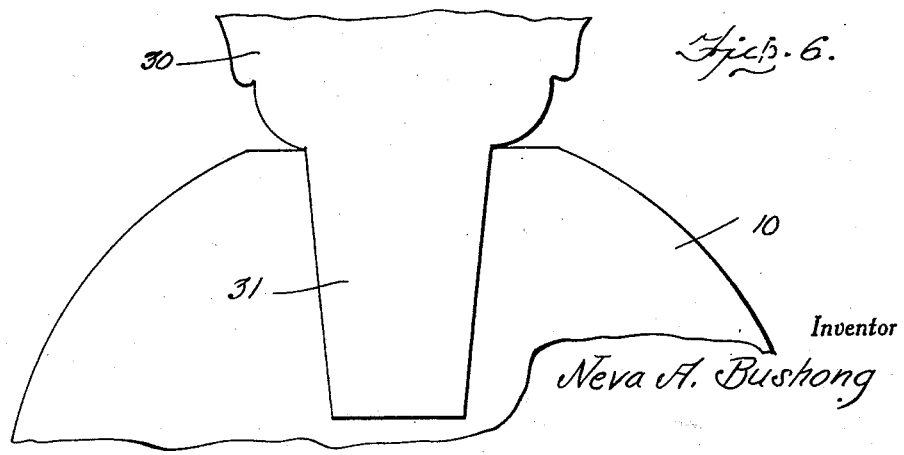
Inventor
Neva A. Bushong
By Clarence A. O'Brien
Attorney April 29, 1930.   N. A. BUSHONG   1,756,482
DEVICE FOR ENCOURAGING DENTAL CORRECTION
Filed July 13, 1929   3 Sheets-Sheet 3
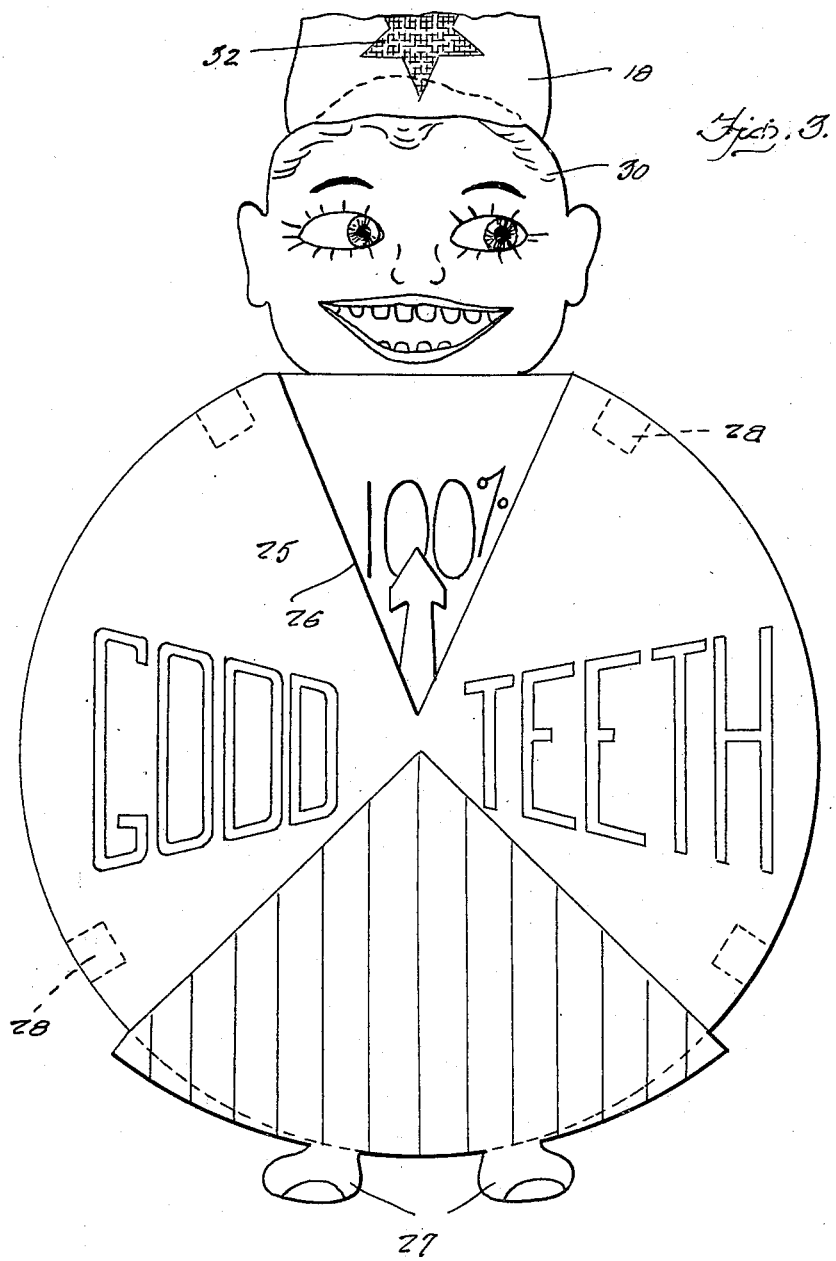
*Inventor*
Neva A. Bushong
By *Clarence A. O'Brien*
*Attorney*

Patented Apr. 29, 1930

1,756,482

UNITED STATES PATENT OFFICE

NEVA A. BUSHONG, OF LAGRANGE, INDIANA

DEVICE FOR ENCOURAGING DENTAL CORRECTION

Application filed July 13, 1929. Serial No. 378,061.

The present invention relates to a device to stimulate interest in dental correction in schools and has for its prime object to provide a device of this nature which will cause engendering of competitive spirit in school children and encouraging them in necessary dental correction.

Another very important object of the invention resides in the provision of a device of this nature which is exceedingly simple in construction, inexpensive to manufacture, capable of affording amusement and encouragement to the children and otherwise thoroughly efficient and reliable for the purpose intended.

With the above and numerous other objects in view, as will appear as the description proceeds, the invention resides in certain novel features of construction and in the combination and arrangement of parts as will be hereinafter more fully described and claimed.

In the drawings:

Figure 1 is an elevation of the card at the first stage of its utility.

Figure 2 shows the same in its second stage.

Figure 3 is the final stage.

Figure 4 is a detail view of the plate card showing one of the tabs for holding the same in place, Figure 5 is a sectional view taken substantially on the line 5—5 of Figure 1, and Figure 6 is a fragmentary rear elevation of the upper portion of the assembly shown in Figure 3.

The numeral 10 denotes a somewhat disc like card, which has a line 11 drawn thereon adjacent the peripheral edge and formed with progressively increasingly large V-shaped inwardly directed projections 12 at every 90°, which are marked 25%, 50%, 75%, and 100%. All of the names of the children in the class are to be written upon the disc or card 10 and they are instructed that as their teeth are pronounced good by the dentist or nurse the names will be checked off. Two hands or pointers 15, 16, are swingably mounted on the center of the card 10 as at 17. The hand 15 is longer than the hand 16. The two hands on the dial card or disc 10 will be set at the place that most nearly represents the percentage of good teeth children when the campaign starts. As the corrections are made, the larger hand is moved to show the percentage of gain, the small hand remaining stationary. When the large hand reaches 75% the children are to be gvien a pasteboard tooth 18, which has a star 19 marked thereon as a reward for achievement thus far. To co-relate this contest with English, the children may write to "Mickey Molar" at a given address telling of this achievement. With the cardboard tooth 18 there will be furnished a substance to paste the tooth within the circle 11, upon the 75% production 12. In this letter of instruction there is also given to the children encouragement to reach the 100% mark, at which time, "Mickey" is to come to see them and thus the children are kept in suspense as to what "Mickey" is. When the large hand reaches the 100% mark, it stays there. A front plate or card 25 is then furnished to the childen and has at its top a V-shaped notch 26 and at its bottom is formed with depending feet 27. On the periphery of this front card 25 there are formed tabs 28, which may be folded over the periphery of the card 10, so that this card 25 may be held in place. The children will be instructed to remove the tooth from the card and the card 25 is put in place so that the 100% shows in the V-shaped notch 26, between the words "good" and "teeth" on the card 25. A head 30 is furnished to the children with an extension 31 which is pasted on the back upper portion of the card 10 and represents the head of "Mickey". The name of the school may be written on the gold star 32, which is on the hat or head 30. It is to be noted that this hat is the tooth 18 turned upside down and has a slit 33 formed therein so as to be placed on the head 30.

It is thought that the construction, utility and advantages of this invention will now become quite apparent to those skilled in this art, without a more detailed description thereof.

The present embodiment of the invention has been disclosed in considerable detail, merely for the purpose of exemplification, since in actual practice it attains the feature of advantage enumerated as desirable in the statement of the invention and the above description.

It will be apparent that changes in the details of construction and in the combination and arrangement of parts may be resorted to, without departing from the spirit or scope of the invention as hereinafter claimed or sacrificing any of its advantages.

What is claimed is:

1. A device of the class described for encouraging dental correction comprising a card, indicia on the card at 90° intervals, a hand swingably mounted on the card to be moved in relation to the indicia, said indicia being formed by a circular line having inwardly directed V-shaped projections at 90° intervals, said projections increasing in a clockwise direction, a pasteboard tooth having a slit therein adapted to be pasted on the card.

2. A device of the class described for encouraging dental correction comprising a card, indicia on the card at 90° intervals, a hand swingably mounted on the card to be moved in relation to the indicia, said indicia being formed by a circular line having inwardly directed V-shaped projections at 90° intervals, said projections increasing in a clockwise direction, a pasteboard tooth having a slit therein adapted to be pasted on the card, a front card having a V-shaped notch in the top thereof, and means for holding it on the first-mentioned card, so that the top V-shaped projection of the indicia may be visible through the notch.

3. A device of the class described for encouraging dental correction comprising a card, indicia on the card at 90° intervals, a hand swingably mounted on the card to be moved in relation to the indicia, said indicia being formed by a circular line having inwardly directed V-shaped projections at 90° intervals, said projections increasing in a clockwise direction, a pasteboard tooth having a slit therein adapted to be pasted on the card, a front card having a V-shaped notch in the top thereof, and means for holding it on the first mentioned card, so that the top V-shaped projection of the indicia may be visible through the notch, legs depending from the second mentioned card.

4. A device of the class described for encouraging dental correction comprising a card, indicia on the card at 90° intervals, a hand swingably mounted on the card to be moved in relation to the indicia, said indicia being formed by a circular line having inwardly directed V-shaped projections at 90° intervals, said projections increasing in a clockwise direction, a pasteboard tooth having a slit therein adapted to be pasted on the card, a front card having a V-shaped notch in the top thereof, and means for holding it on the first mentioned card, so that the top V-shaped projection of the indicia may be visible through the notch, legs depending from the second mentioned card, a head having an extension adapted to be pasted on the rear portion of the first card.

In testimony whereof I affix my signature.

NEVA A. BUSHONG.